Figure 1:
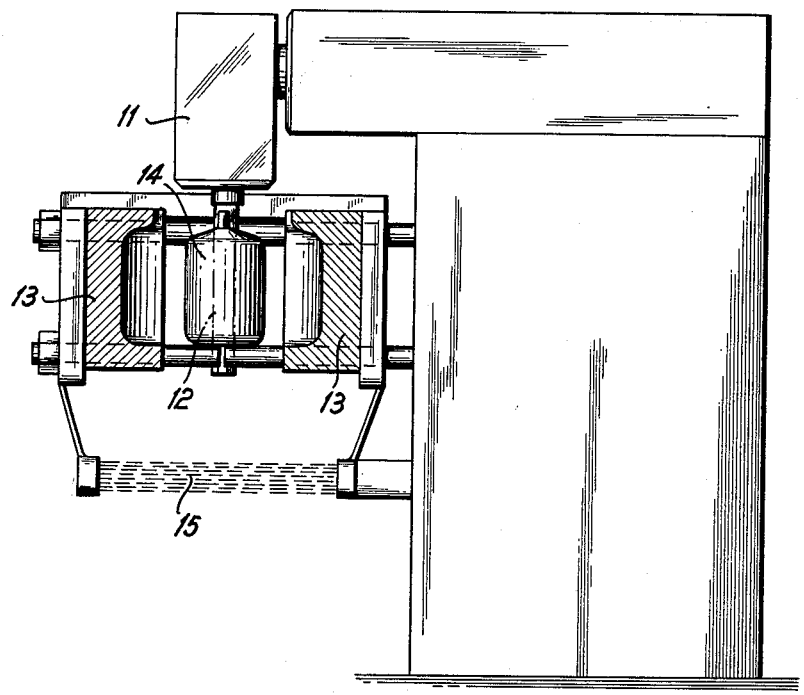

Feb. 18, 1964     E. LANGECKER ET AL     3,121,797
LIGHT BARRIER MEANS FOR AUTOMATIC CONTROL OF FINISHED PRODUCTS
Filed Aug. 5, 1960     2 Sheets-Sheet 1

INVENTORS

United States Patent Office 3,121,797
Patented Feb. 18, 1964

3,121,797
LIGHT BARRIER MEANS FOR AUTOMATIC
CONTROL OF FINISHED PRODUCTS
Erhard Langecker and Nidgard Würfel, Meinerzhagen,
Germany, assignors to Firma Gebr. Battenfeld, Meinerzhagen, Germany, a corporation of Germany
Filed Aug. 5, 1960, Ser. No. 47,772
1 Claim. (Cl. 250—222)

The present invention relates to an apparatus for the automatic control of machines, as hollow-body-blowing-, spraying-, pressure-casting-automatic machines or the like for the production of final parts.

Such devices are known, for instance, in connection with die-casting automats, wherein upon termination of a process step, the removed finished part releases the next working step.

This is brought about in many instances in such a manner that the finished part is required to pass a trough or a shaft, a scale or an electromechanical, vertical contact plate or a contact plate inclined at 45°. The scale system has not been found effective due to its slow reaction. The contact plate disposed under an angle of 45° reacts only to piece weights above 10 grams and does not close up during the closing step of the form, the trough or path, as the vertical contact plate, which, however, in case of piece weights below 2 grams and more than ten working steps per minute likewise does not respond fast enough.

Furthermore, it is also known to use for the automatic control of a die-cast machine a light barrier, which is passed by the finished part falling through. The known light barriers react though with weights below 2 grams and also in case of more than ten working steps per minute, since they operate practically without retardation or without any inertia. They have, however, for instance, in hollow-body-blow automats the drawback, that in case of a very long sleeve raw member, upon switching on the light barrier prior to the removal of the finished part, the light ray is interrupted and, thereby, the new closing step for the machine is released, without throwing out the finished part under all circumstances. This can lead to damages on the sensitive forms and does not provide a safe automatic control of the machines.

Furthermore, the known control means with light barriers do not provide any protection against the penetration into the fall-out shaft, in order to remove finished parts which remain stuck in the form. Due to such penetration the light ray is likewise interrupted and the closing movement of the form is started. If this is brought about, for instance, by the hand of the operator, the hand of such operator can be squeezed by the closing form. If the operator uses a hard rod as an auxiliary tool for this purpose, then the form can be heavily damaged.

It is, therefore, one object of the present invention to provide an apparatus for the automatic control of machines, i.e., hollow-body-blowing-, spraying-, pressure-casting-automatic machines or the like which avoid this drawback in automatically and electrically controlled machines with a light barrier in advantageous manner.

It is another object of the present invention to provide an apparatus for the automatic control of machines, i.e., hollow-body-blowing-, spraying-, pressure-casting-automatic machines or the like wherein the closing movement of the form only starts upon termination of the interruption of the light ray by the falling down or ejected finished part and wherein upon interruption of the light ray during a started new working process, the latter is stopped.

In case of the performance of the working passes which is contrary to a predetermined program, the machine is stopped. In this manner damages to the form and to the machine, as well as accidents to the operators are avoided.

By an optical or/and acoustical signal any disturbances may be easily indicated, so that a direct operation by an individual operator for each machine is superfluous.

Figure 2:
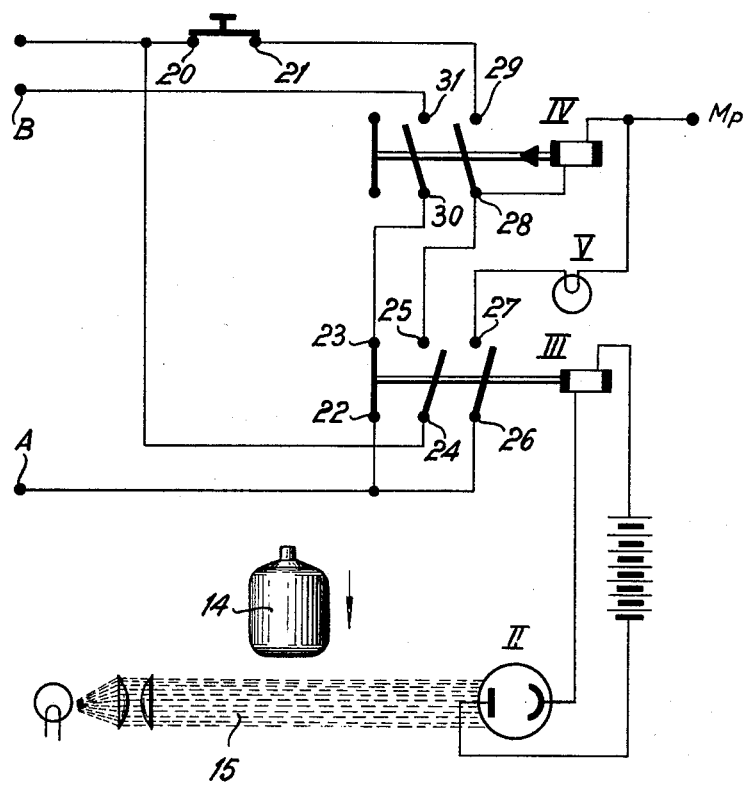

With these and other objects in view which will become apparent in the following detailed description, the present invention will be clearly understood in connection with the accompanying drawings, in which:

FIGURE 1 is a schematic elevation, partly in section, of a hollow-body-blow automat; and FIG. 2 is a circuit diagram of a control device for the hollow-body-blow automat.

Referring now to the drawings, and in particular to FIG. 1, the hollow-body-blow automat comprises a sleeve head 11, from which the sleeve raw member 12, shown in point-dotted lines, projects, the latter being blown up upon closing the two tool halves or the form 13 into a hollow body 14, for instance into a bottle. Upon termination of the blowing process, the hollow body 14 is vented and the finished hollow body is ejected from the form 13. It falls vertically downwards and passes the light barrier 15 consisting of a plurality of parallel light rays. Due to the passing of the light barrier 15, a switching process takes place which is performed in accordance with the circuit shown in FIG. 2, in the following manner:

In case a form or the tool halves 13 are in their closed position, the terminals 20, 21 are disconnected. At the start of the opening movement of the form 13, the terminals 20, 21 are connected. Due to the interruption of the light ray 15 by the falling, completely blown up hollow body 14, the photocell II is rendered inoperative and the relay III opens. By this operation, the terminals 22, 23 are disconnected and the terminals 24, 25 and 26, 27, respectively, are connected. This in turn causes an excitement of the relay IV over the connected terminals 24, 25 and the terminals 28, 29 and 30, 31, respectively, are connected. The relay IV receives now the holding current. The terminals 28, 29 and 30, 31, respectively, remain connected.

After the finished blown hollow body 14 has passed the light barrier 15, the photo cell II excites the relay II. By this arrangement, the terminals 22, 23 are connected and the terminals 24, 25 and 26, 27, respectively, are disconnected. Upon run of a time switch, the terminal A receives current which flows freely to the terminal B. The relay marked "form closed" receives an impulse and the closing movement of the form starts. If a hollow body remains between the light barrier 15, the terminals 22, 23 are not closed, and the form remains open. Upon run-out of the time switch, the signal V receives current over the terminals 26, 27. This signal V can be an optical or an acoustical signal.

If during the closing movement the light barrier 15 is again interrupted, the relay III opens likewise and the terminals 22, 23 are disconnected and, thereby, the closing movement is stopped. The signal device V is again operated over the terminals 26, 27. Only upon removal of the disturbance, that is, if the photocell II excites again the relay III, the terminals 22, 23 are connected and the closing movement is continued and terminated. If the form 13 is in a completely closed position, the end terminals 20, 21 are disconnected. By this arrangement the holding current 28, 29 is interrupted and the relay IV opens.

While we have disclosed one embodiment of the present invention, it is to be understood that this embodiment is given by example only and not in a limiting sense, the scope of the present invention being determined by the objects and the claim.

We claim:

An apparatus for the automatic control of automatically operating machines for the production of finished products, comprising
 means forming a light barrier,
 the latter being adapted to be passed by said finished products upon finishing the same,
 means for stopping the operation of said apparatus during the interruption of said light barrier and simultaneously closing a holding circuit,
 means for putting signal means into operative readiness in response to said interruption of said light barrier,
 time controlled means for rendering operative said signal means after a predetermined time period from said interruption of said light barrier,
 means for starting the next working cycle in response to the termination of the period of interruption of said light barrier, as well as stopping said next working cycle upon renewed interruption of said light barrier during said working cycle.

References Cited in the file of this patent

UNITED STATES PATENTS

| | | |
|---|---|---|
| 1,962,742 | Jongedyk | June 12, 1934 |
| 1,980,294 | Ross et al. | Nov. 13, 1934 |
| 2,158,069 | Grover | May 16, 1939 |
| 2,329,715 | Grier | Sept. 21, 1943 |
| 2,383,313 | Hoffman et al. | Aug. 21, 1945 |
| 2,433,560 | Hurley | Dec. 30, 1947 |
| 2,586,052 | Johnson | Feb. 19, 1952 |
| 2,652,167 | Havener | Sept. 15, 1953 |
| 2,666,148 | Arvintz et al. | Jan. 12, 1954 |
| 2,777,934 | Falkenthal | Jan. 15, 1957 |